US012573939B2

(12) United States Patent　　　(10) Patent No.:　US 12,573,939 B2
Penttonen et al.　　　　　　　　(45) Date of Patent:　　Mar. 10, 2026

(54) SYSTEM AND METHOD FOR ZERO VOLTAGE SWITCHING IN A POWER CONVERTER

(71) Applicant: Vensum Power Oy, Espoo (FI)

(72) Inventors: Jyrki Penttonen, Helsinki (FI); Natan Baron-Trocellier, Espoo (FI)

(73) Assignee: Vensum Power Oy, Espoo (FI)

( * ) Notice: Subject to any disclaimer, the term of this patent is extended or adjusted under 35 U.S.C. 154(b) by 222 days.

(21) Appl. No.: 18/561,993

(22) PCT Filed: May 6, 2022

(86) PCT No.: PCT/FI2022/050302
　　§ 371 (c)(1),
　　(2) Date: Nov. 17, 2023

(87) PCT Pub. No.: WO2022/243596
　　PCT Pub. Date: Nov. 24, 2022

(65) Prior Publication Data
　　US 2024/0250600 A1　　Jul. 25, 2024

(30) Foreign Application Priority Data
　May 18, 2021　(FI) ..................................... 20215586

(51) Int. Cl.
　　*H02M 3/158*　　　(2006.01)
　　*H02M 1/00*　　　　(2006.01)
　　H02M 7/219　　　　(2006.01)
(52) U.S. Cl.
　　CPC ....... *H02M 1/0058* (2021.05); *H02M 1/0009* (2021.05); *H02M 1/0012* (2021.05); *H02M 3/158* (2013.01); *H02M 7/219* (2013.01)
(58) Field of Classification Search
　　CPC ............. H02M 1/0058; H02M 1/0048; H02M 1/0054; H02M 1/0043; H02M 1/0009;
　　　　　　　(Continued)

(56) References Cited

U.S. PATENT DOCUMENTS

| 5,568,368 A | 10/1996 | Steigerwald et al. |
| 2007/0007933 A1 | 1/2007 | Chan et al. |

(Continued)

FOREIGN PATENT DOCUMENTS

| WO | 2017023982 A1 | 2/2017 |
| WO | 2019224431 A1 | 11/2019 |

OTHER PUBLICATIONS

European Patent Office, International Search Report and Written Opinion, Application No. PCT/FI2022/050302, Mailed Aug. 3, 2022, 15 pages.

(Continued)

*Primary Examiner* — Nguyen Tran
(74) *Attorney, Agent, or Firm* — Ziegler IP Law Group, LLC.

(57)　　　　　　ABSTRACT

Disclosed is a system for zero voltage switching in a power converter with a first half-bridge and a second half-bridge. The first half-bridge has a first set of transistors and output inductor. The second half-bridge has a second set of transistors and auxiliary inductor. A current sensing means measures, at switching cycle scale, average and maximum current values of output inductor and average, minimum and maximum current values of auxiliary inductor. A voltage sensing means measures input and output voltages of first and second half-bridge. A controller is configured to compute dead times of pulse width modulation control signal of second half-bridge, generate pulse width modulation control signal of second half-bridge and to adapt dead times of first half-bridge.

15 Claims, 7 Drawing Sheets

(58) Field of Classification Search
CPC ............. H02M 1/0003; H02M 1/0006; H02M
1/0012; H02M 7/219; H02M 7/217;
H02M 7/2176; H02M 7/23; H02M 3/158;
H02M 3/1586; H02M 3/157
See application file for complete search history.

(56) References Cited

U.S. PATENT DOCUMENTS

| | | | |
|---|---|---|---|
| 2010/0131219 A1 | 5/2010 | Kenly et al. | |
| 2012/0105039 A1 | 5/2012 | Brown | |
| 2014/0177300 A1 | 6/2014 | Lagorce et al. | |
| 2019/0267895 A1* | 8/2019 | Masuda ................ | H02M 3/155 |
| 2021/0028690 A1 | 1/2021 | Fromme et al. | |

OTHER PUBLICATIONS

Finnish Patent and Registration Office, Search Report, U.S. Appl. No. 20/215,586, Mailed Jan. 18, 2022, 1 page.

* cited by examiner

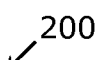
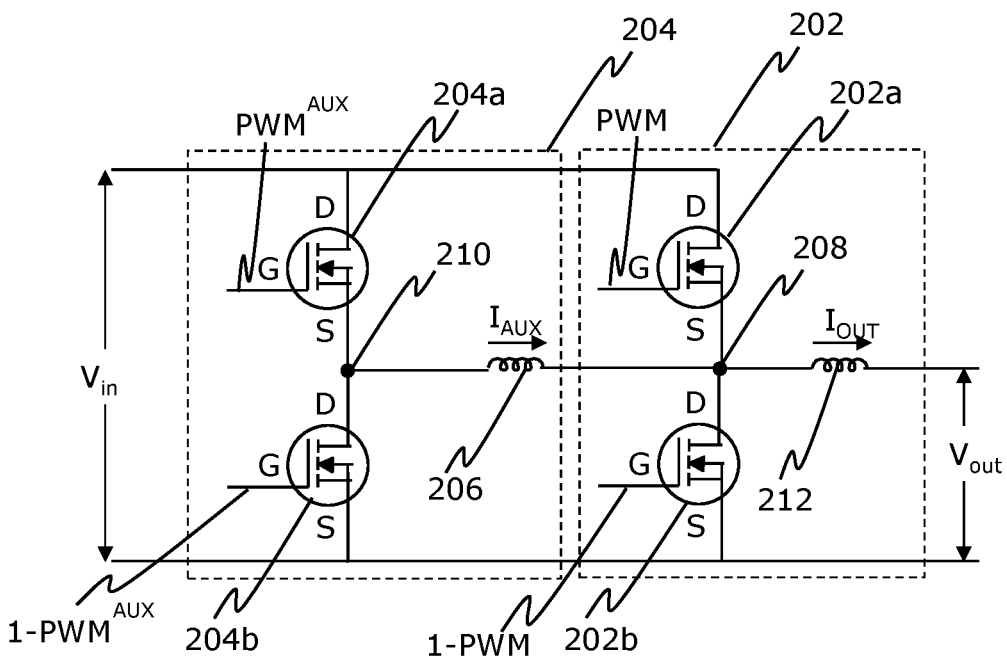
FIG. 2

Main PWM Control Signal Level
400A
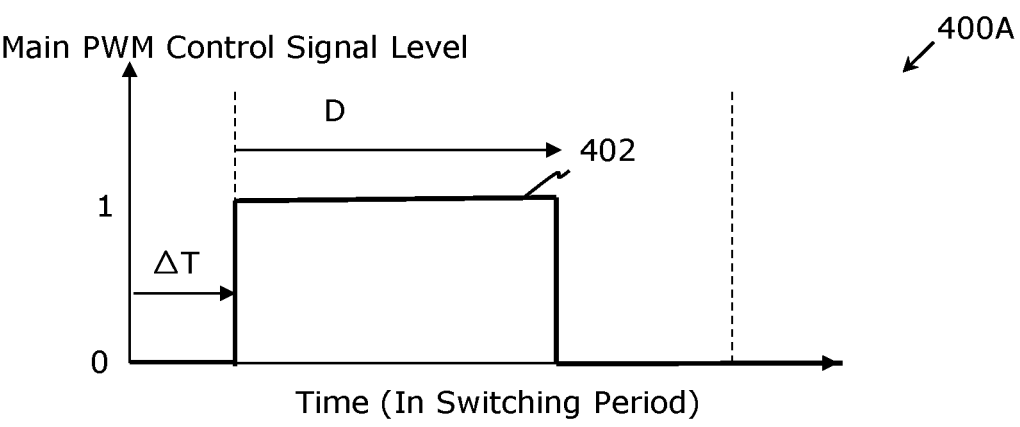
FIG. 4A
Auxiliary PWM Control Signal Level
400B
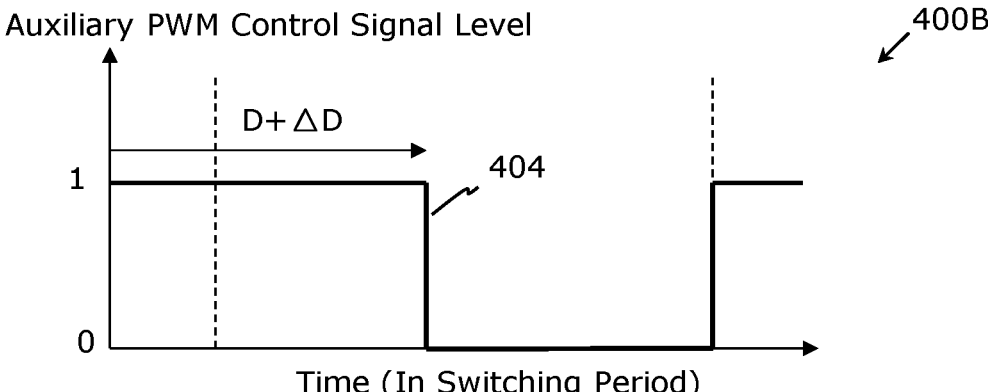
FIG. 4B
400C
Current
FIG. 4C

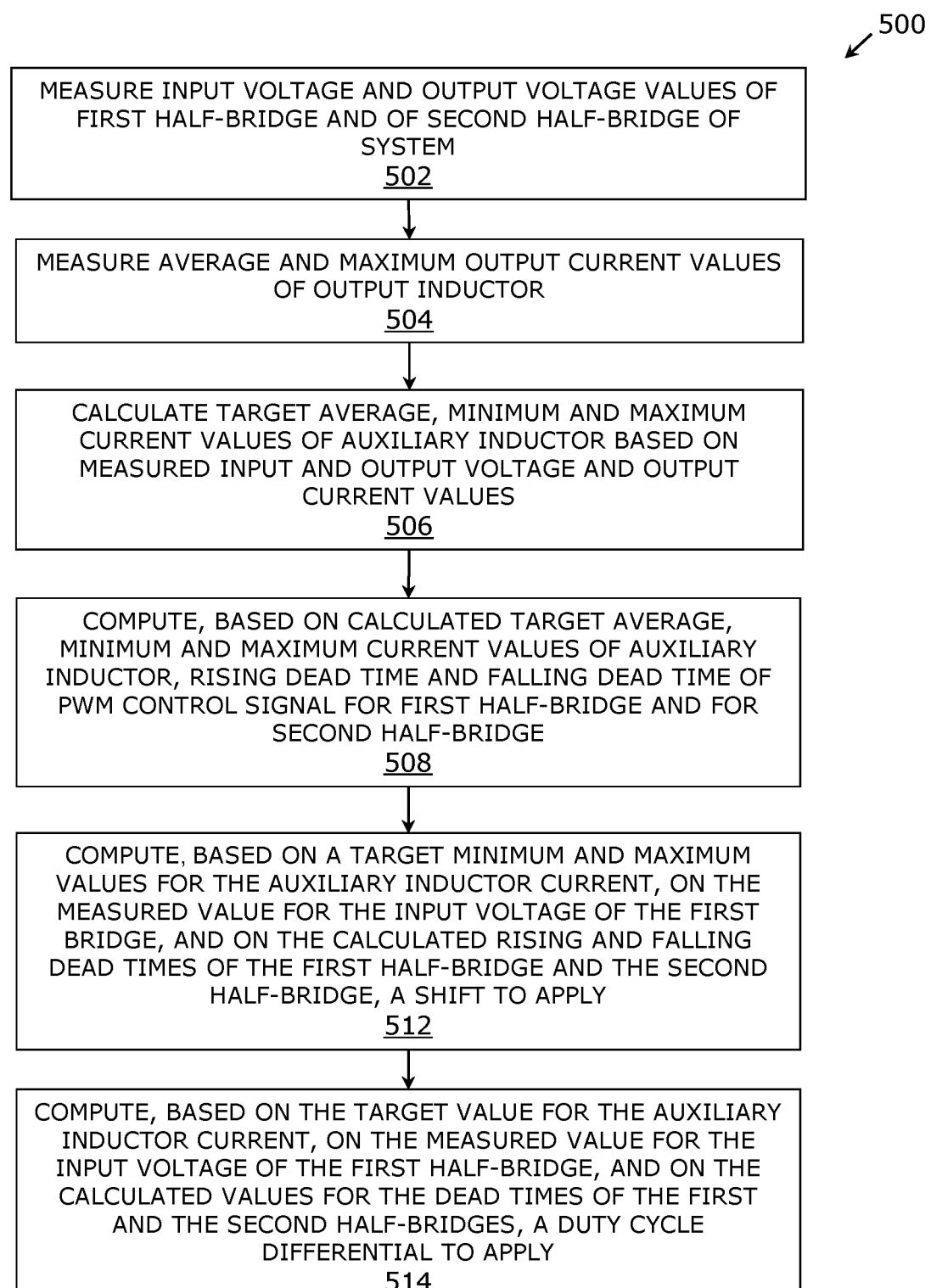

500

MEASURE INPUT VOLTAGE AND OUTPUT VOLTAGE VALUES OF FIRST HALF-BRIDGE AND OF SECOND HALF-BRIDGE OF SYSTEM
502

MEASURE AVERAGE AND MAXIMUM OUTPUT CURRENT VALUES OF OUTPUT INDUCTOR
504

CALCULATE TARGET AVERAGE, MINIMUM AND MAXIMUM CURRENT VALUES OF AUXILIARY INDUCTOR BASED ON MEASURED INPUT AND OUTPUT VOLTAGE AND OUTPUT CURRENT VALUES
506

COMPUTE, BASED ON CALCULATED TARGET AVERAGE, MINIMUM AND MAXIMUM CURRENT VALUES OF AUXILIARY INDUCTOR, RISING DEAD TIME AND FALLING DEAD TIME OF PWM CONTROL SIGNAL FOR FIRST HALF-BRIDGE AND FOR SECOND HALF-BRIDGE
508

COMPUTE, BASED ON A TARGET MINIMUM AND MAXIMUM VALUES FOR THE AUXILIARY INDUCTOR CURRENT, ON THE MEASURED VALUE FOR THE INPUT VOLTAGE OF THE FIRST BRIDGE, AND ON THE CALCULATED RISING AND FALLING DEAD TIMES OF THE FIRST HALF-BRIDGE AND THE SECOND HALF-BRIDGE, A SHIFT TO APPLY
512

COMPUTE, BASED ON THE TARGET VALUE FOR THE AUXILIARY INDUCTOR CURRENT, ON THE MEASURED VALUE FOR THE INPUT VOLTAGE OF THE FIRST HALF-BRIDGE, AND ON THE CALCULATED VALUES FOR THE DEAD TIMES OF THE FIRST AND THE SECOND HALF-BRIDGES, A DUTY CYCLE DIFFERENTIAL TO APPLY
514

FIG. 5

SYSTEM AND METHOD FOR ZERO VOLTAGE SWITCHING IN A POWER CONVERTER

TECHNICAL FIELD

The present disclosure relates generally to power converters; and more specifically, to system and method for zero voltage switching in a power converter.

BACKGROUND

In the field of electrical engineering, a power converter is an electrical or electro-mechanical device that converts electrical energy from one form to another. Notably, there is a growing demand for devices with specific characteristics, such as isolated or non-isolated conversion, medium voltage level (for example, 200V to 1200V), medium-to-high power level (for example, 10 kW-500 kW), and high switching frequency (for example, 200 kHz and more). Specifically, many converter types that could be adapted to fulfil the previous requirements are based on half-bridge building blocks. A half-bridge is defined as an assembly of two transistors, driven by complementary pulse width modulation (PWM) signals and a switching node of the two transistors is connected to an output inductor. The transistors may be, for example, field-effect transistors or insulated-gate bipolar transistors, such as power metal-oxide-semiconductor field-effect transistor (MOSFET) that exhibit enhanced switching speed so that such power converters achieve higher power density than traditional "slow-switching" power converters, while maintaining similar-to-higher levels of efficiency.

However, the main limiting factor for increasing the switching frequency is turn-on losses in the transistors, as energy dissipation occurs whenever the transistor is closed. Such turn-on losses can be mitigated using Zero-Voltage Switching (ZVS) technique. ZVS allows for driving the voltage of each transistor to zero before turning them on. However, in many power converter topologies, achieving ZVS is not possible for at least one transition, which prevents them from being operated at high switching frequencies without a large efficiency drop. Thus, there exists a technical problem of enabling ZVS in a half-bridge for all its transitions, without altering its behavior from the converter point of view.

Existing systems and methods utilize various approaches to address the aforesaid problem. In accordance with a hardware-based approach, an auxiliary resonant commutated pole (ARCP) converter is a converter design where an auxiliary resonance circuit is attached to every half-bridge. ZVS is implemented in each half-bridge by having its auxiliary circuit send a current pulse upon switching UP. However, in such a hardware-based approach, the auxiliary resonance circuit itself comprises hard-switching transistors, thus cannot be used above a certain switching frequency.

In accordance with a control-based approach, such as critical conduction mode (CCM), a small output inductor allows for large current ripple so that the output inductor current becomes negative when rising transition occurs. Switching frequency is adjusted in order to control the amount of output current ripple. With this approach, ZVS is allowed for all transitions of a half-bridge topology. However, it is difficult to apply it for a multi-half-bridge system since switching frequencies need to be the same. Furthermore, the large range of the switching frequency range makes electromagnetic interference (EMI) filter, control, sensor and passive component designs of the system more difficult. Such approach is inefficient for DC/DC power conversion application, as generated conduction loss increase becomes larger than the achieved switching loss reduction.

Therefore, considering the foregoing discussion, there exists a need to overcome the aforementioned drawbacks associated with conventional devices and approaches employed for zero voltage switching in a power converter.

SUMMARY

The present disclosure seeks to provide a system for zero-voltage switching in a power converter. The present disclosure also seeks to provide a method for zero-voltage switching in a power converter. The present disclosure seeks to provide a solution to the existing problem of enabling zero-voltage switching (ZVS) in a half-bridge for all its transitions, without altering its behavior from the converter point of view. An aim of the present disclosure is to provide a solution that overcomes at least partially the problems encountered in prior art and provides a zero-voltage switching in a power converter.

In one aspect, an embodiment of the present disclosure provides a system for zero-voltage switching in a power converter, the system comprising:

a first half-bridge and a second half-bridge, wherein the first half-bridge comprises a first set of transistors and an output inductor connected to a switching node of the first set of transistors, forming thereat a first circuit;

the second half-bridge comprises a second set of transistors and an auxiliary inductor connected to a switching node of the second set of transistors and to the switching node of the first set of transistors, forming thereat a second circuit;

a current sensing means configured to measure, at switching cycle scale, an average and maximum current values of the output inductor and an average, minimum and maximum current values of the auxiliary inductor;

a voltage sensing means configured to measure an input and output voltages of the first half-bridge and the second half-bridge;

a controller configured to compute dead times of PWM control signal of the second half-bridge, generate PWM control signal of the second half-bridge and to adapt dead times of the first half-bridge.

In another aspect, an embodiment of the present disclosure provides a method for zero-voltage switching in a power converter, the method comprising:

measuring an input voltage and an output voltage values of a first half-bridge and of a second half-bridge of a system;

measuring an average and maximum output current values of an output inductor;

calculating a target average, minimum and maximum current values of an auxiliary inductor based on the measured input and output voltage and the output current values;

computing, based on the target average, minimum and maximum current values of the auxiliary inductor, a rising dead time and a falling dead time of PWM control signal for a first half-bridge and for a second half-bridge;

computing, based on the target minimum and maximum values for the auxiliary inductor current, on the measured value for the input voltage of the first bridge, and on the calculated rising and falling dead times of the first half-bridge and the second half-bridge, a shift to apply;

computing, based on the target value for the auxiliary inductor current, on the measured value for the input voltage of the first half-bridge, and on the calculated values for the dead times of the first and the second half-bridges, a duty cycle differential to apply.

Embodiments of the present disclosure substantially eliminate or at least partially address the aforementioned problems in the prior art, and enables usage of an auxiliary half-bridge circuit, along with an auxiliary inductor, as a current source and allows ZVS in a main half-bridge circuit. Further, the present disclosure enables the auxiliary PWM control signal of the auxiliary half-bridge to lead the main half-bridge by a variable phase angle, with corresponding duty cycles close to equal.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various arrangements without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein:

FIG. 2 is a schematic electrical circuit diagram of an auxiliary circuit, in accordance with an exemplary embodiment of the present disclosure;

FIGS. 4A, 4B, and 4C are schematic illustrations of waveforms, in accordance with an embodiment of the present disclosure;

FIG. 5 is a flow chart depicting steps of a method for zero voltage switching in a power converter, in accordance with an embodiment of the present disclosure;

Figure 1A:
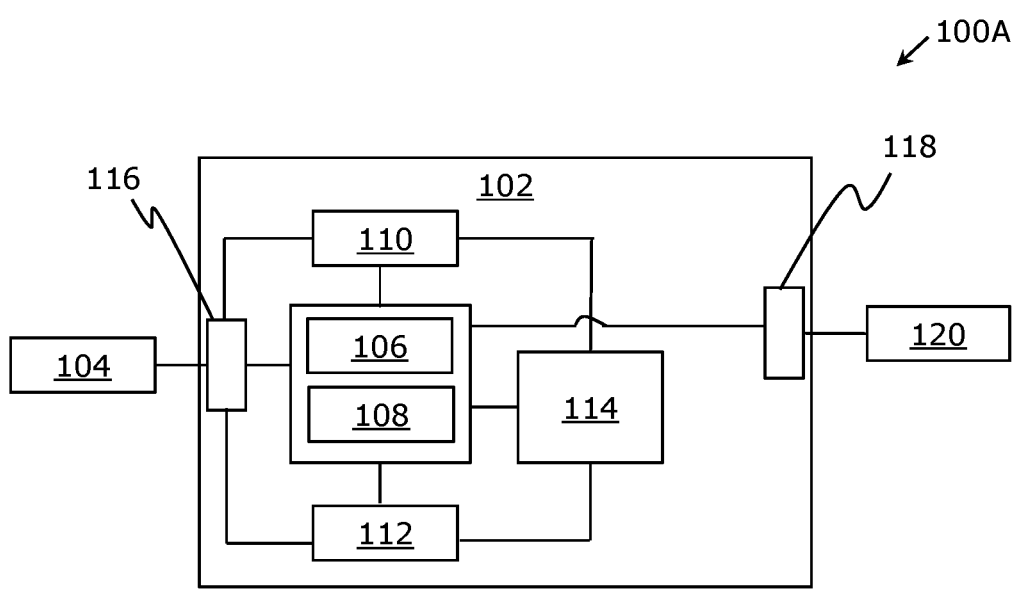
FIG. 1A is a block diagram of a power converter, in accordance with an embodiment of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In one aspect, an embodiment of the present disclosure provides a system for zero-voltage switching in a power converter comprising:

a first half-bridge and a second half-bridge, wherein the first half-bridge comprises a first set of transistors and an output inductor connected to a switching node of the first set of transistors, forming thereat a first circuit;

the second half-bridge comprises a second set of transistors and an auxiliary inductor connected to a switching node of the second set of transistors and to the switching node of the first set of transistors, forming thereat a second circuit;

a current sensing means configured to measure, at switching cycle scale, an average and maximum current values of the output inductor and an average, minimum and maximum current values of the auxiliary inductor;

a voltage sensing means configured to measure an input and output voltages of the first half-bridge and the second half-bridge;

a controller configured to compute dead times of PWM control signal of the second half-bridge, generate PWM control signal of the second half-bridge and to adapt dead times of the first half-bridge.

In another aspect, an embodiment of the present disclosure provides a method for zero-voltage switching in a power converter comprising:

measuring an input voltage and an output voltage values of a first half-bridge and of a second half-bridge of a system;

measuring an average and maximum output current values of an output inductor;

calculating a target average, minimum and maximum current values of an auxiliary inductor based on the measured input and output voltage and the output current values;

computing, based on the target average, minimum and maximum current values of the auxiliary inductor, a rising dead time and a falling dead time of PWM control signal for a first half-bridge and for a second half-bridge;

computing, based on the target minimum and maximum values for the auxiliary inductor current, on the measured value for the input voltage of the first bridge, and on the calculated rising and falling dead times of the first half-bridge and the second half-bridge, a shift to apply;

computing, based on the target value for the auxiliary inductor current, on the measured value for the input voltage of the first half-bridge, and on the calculated values for the dead times of the first and the second half-bridges, a duty cycle differential to apply.

The power converter as described in the present disclosure comprises two half-bridge circuits, such as a first half-bridge and a second half-bridge, as building blocks that implements various power conversion topologies (such as, AC/DC and DC/DC, non-isolated conversion). The second half-bridge, which is an auxiliary half-bridge, when attached to the first half-bridge, which is an existing half-bridge, allows ZVS for all its transitions. Beneficially, the second half-bridge works as a current source, that drives the switching node current of the first half-bridge to the desired value before each of its transitions.

The role of the auxiliary inductor in the second half-bridge is to help ZVS in the first half-bridge and allow for ZVS in the second half-bridge. Specifically, the second half-bridge determines whether ZVS is possible or not in the first half-bridge, based on the difference between the current values of output inductor and auxiliary inductor. Therefore, the second half-bridge is able to control the evolution of the current of the auxiliary inductor, allowing for full ZVS in the first half-bridge in the power converter. Also, in the second half-bridge, whether ZVS is possible or not depends on the direction and amplitude of the current of the auxiliary inductor only, thus allowing for full ZVS in the auxiliary half-bridge as well. Notably, the power converter can be implemented in high frequency switching environment.

Furthermore, the power converter as described herein, replaces a single half-bridge (i.e., the first half-bridge), which is unable to perform ZVS, with two half-bridges (i.e., the second half-bridge in combination with the first half-bridge) with full ZVS capability. The power converter is only able to "see" the first half-bridge, the operation of which is left unchanged and therefore, the design and operation of the power converter is not affected. Such scalability and flexibility in operation of the power converter ensures hassle-free adaptation of the power converter based on varying needs of the user.

Additionally, a second PWM control signal of the second half-bridge leads a first PWM control signal of the first half-bridge by a variable phase angle or a certain duration (i.e., the shift). Furthermore, duty cycles of the first and second PWM signals differ by a small amount in order to introduce a set amount of DC current in the auxiliary inductor. Accordingly, dead times of the first half-bridge are adapted to ensure that ZVS occurs at all times. Beneficially, the power converter ensures efficient and simplified power conversion at high frequency switching. It will be appreciated that the implementation of the power converter in a high frequency switching environment reduces the size and footprint of the power converter and enhances efficiency thereof; and further provides new opportunities regarding new control algorithms.

The present disclosure discloses the system for zero-voltage switching in a power converter. The power converter converts input electrical power to output electrical power using an auxiliary half-bridge, which is connected to an existing main half-bridge. Beneficially, the auxiliary half-bridge in the power converter adapts dead times of the main half-bridge to ensure that ZVS occurs at all the times, i.e., for each rising and falling transition of the main half-bridge. Thus, full ZVS is achieved in normally-hard-switching half-bridges of the equipped power converters. Notably, ZVS is a zero-voltage switching technique that can mitigate dissipation of electrical energy that occurs whenever the transistors are closed in high switching frequency circuits.

The power converter comprises a first half-bridge and a second half-bridge. The first half-bridge comprises a first set of transistors and an output inductor connected to a switching node of the first set of transistors, forming thereat a first circuit. The first circuit may be also referred to as a main circuit. The second half-bridge comprises a second set of transistors and an auxiliary inductor connected to a switching node of the second set of transistors and to the switching node of the first set of transistors, forming thereat a second circuit. The second circuit may be also referred to as an auxiliary circuit.

It can be appreciated that a switching node is a node between two switching elements, i.e., the transistors, that experiences a rapidly changing voltage based on whether the high or low side transistor is on. For example, the voltage at the switching node may vary between a source voltage and ground with a duty cycle, thus providing an average voltage at the switching node. It will be further appreciated that the plurality of switching nodes of a plurality of half-bridges control electrical power flowing therethrough thereby converting input electrical power to output electrical power such that the output electrical power is half of the input electrical power. Optionally, the plurality of half-bridges is connected to form one or more full-bridge such that the output electrical power is substantially equal to the input electrical power.

The first half-bridge, as used in the present disclosure, is driven by PWM control signals of the first half-bridge, referred to as main PWM control signals. Similarly, the second half-bridge is driven by PWM control signals of the second half-bridge, referred to as auxiliary PWM control signals. The PWM control signals of the second half-bridge is generated based on a switching period, a duty cycle, a shift and a duty cycle differential parameter. Notably, the gate terminals of the first set of transistors are driven by complementary PWM control signals of the first half-bridge.

Further, the gate terminals of the second set of transistors are driven by complementary PWM control signals of the second half-bridge.

Notably, with reference to FIG. 2, the top transistor of the first half-bridge operates by a main PWM control signal and the bottom transistor of the first half-bridge operates by a complementary main PWM control signal. When the main PWM control signal is on and in active state, the top transistor is accordingly closed and on (in an active state) and conducting the current $I_{OUT}$ in the output inductor. At the same time, the complementary main PWM control signal is off and in non-active state. Accordingly, the bottom transistor is open and off (in a non-active state) and not conducting the current. The behavior of the transistors in the second half-bridge is the same apart from the fact that firstly, the current $I_{AUX}$ is conducted in the auxiliary inductor. Secondly, the auxiliary PWM control signals will lead the main PWM control signals by a variable phase angle, though their duty cycles are close to equal. Notably, when transistors in both the first and the second half-bridges are simultaneously switched ON or switched OFF, the derivative of the current of the auxiliary inductor is 0. In accordance with a first configuration, when the top transistor of the second half-bridge is switched ON (consequently the bottom transistor of the second half-bridge is switched OFF), the top transistor of the first half-bridge is switched OFF (consequently the bottom transistor of the second half-bridge is switched ON). Accordingly, the derivative of the current of the auxiliary inductor is non-zero but with a positive value, i.e., $+V_{in}/L_{aux}$ (where $+V_{in}$ refers to input voltage and $L_{aux}$ refer to auxiliary inductance). In accordance with a second configuration, the top transistor of the second half-bridge is switched OFF and the top transistor of the first half-bridge is switched ON. Accordingly, the derivative of the current of the auxiliary inductor is again non-zero but with a negative value, i.e., $-V_{in}/L_{aux}$. The relation between the different states of the first and second half-bridges respectively, and the evolution of the auxiliary inductor current is summarized in the Table 2 below.

Without the second half-bridge, the direction and amplitude of the current of the output inductor determines whether ZVS is possible or not in the first half-bridge. Beneficially, with the second half-bridge, the difference between the current values of the output inductor and the auxiliary inductor determines whether ZVS is possible or not in the first half-bridge. Since the second half-bridge is able to control the evolution of the auxiliary inductor current, full ZVS is allowed in the first half-bridge. In the second half-bridge, whether ZVS is possible or not depends on the direction and amplitude of the current of the auxiliary inductor only. Therefore, full ZVS is allowed in the second half-bridge as well. In such a manner, the two half-bridges in the power converter perform ZVS with full capability. The ZVS conditions in the first and the second half-bridges are summarized in Table 1 below.

Notably, the power converter is constructed by employing elements, for example, a plurality of transistors, a plurality of inductors, the plurality of switching nodes, and a plurality of connecting wires. Optionally, the plurality of transistors may be field effect transistors (FETs) or insulated-gate bipolar transistors (IGBTs). Notably, an FET has three terminals, namely, source, drain and gate. Specifically, the FET controls the flow of current by application of a voltage to the gate terminal, wherein the voltage applied to the gate alters conductivity between the drain terminal and the source terminal thereby allowing controlled flow of current therethrough. Optionally, the plurality of FETs may be n-channel FETs, p-channel FETs, or a combination thereof. More optionally, the plurality of FETs may be Junction Field-Effect Transistors (JFETs), Metal-oxide-semiconductor Field-Effect Transistors (MOSFETs), Complimentary MOS-FETs (CMOSFETs), Metal-Nitride-Oxide-Semiconductor Transistors (MNOS), Modulation-doped FETs (MODFETs), Organic FETs (OFETs), Graphene-based FET (GFETs), Ferro-electric FETs (Fe FETs), or a combination thereof. Furthermore, optionally, the plurality of transistors may be constructed using, for example, Silicon Carbide (SiC), gallium arsenide (GaAs), gallium nitride (GaN), indium gallium arsenide (InGaAs), germanium, and graphene.

It will be appreciated that the input electrical power supply refers to a source that provides the input electrical power. Examples of the input electrical power supply include, but are not limited to, electric power grid (for example, electric outlets), energy storage devices (for example, battery arrangement, fuel cells), generators, alternators and solar panels. In an example, the input electrical power supply provides alternating current (AC) and the generated output electrical power provides direct current (DC), as described in FIG. 3. Furthermore, the power converter is implemented to perform power conversion on any of AC or DC input electrical power supply, to generate the output electrical power as DC, to implement combinations, such as AC/DC or DC/DC, without any deviation from the scope of the disclosure.

The power converter further comprises a current sensing means configured to measure, at switching cycle scale, an average, a minimum and maximum current values of the output inductor and an average, minimum and maximum current values of the auxiliary inductor. Specifically, the current sensing means refers to a current sensor configured to detect and/or respond to input current level of electrical power across the output inductor and the auxiliary inductor. Optionally, the current sensing means includes components, such as sensors, memory, processor, network adapter, battery, and the like, to detect, store, process and/or share information with other computational elements, such as a user device, the controller, and so forth. More optionally, the current sensing means operates autonomously to continuously detect the average and maximum current values of the output inductor and the average, minimum and maximum current values of the auxiliary inductor. Beneficially, the average and maximum current value of the output inductor and the average, minimum and maximum current values of the auxiliary inductor are measured so that an error on amplitude and average current values of the auxiliary inductor are calculated if previous values of shift and duty differential values are inaccurate. Accordingly, shift and duty differentials are adjusted to compensate for the errors.

In this regard, the sensors in the current sensing means detect a specific attribute (namely, input current) of the electrical power across any component, such as the auxiliary inductor and the output inductor. The specific attribute of the electrical power is communicated to the controller using, for example, wired communication means or wireless communication means. Optionally, the current sensing means stores the specific attribute of the electrical power in memory associated therewith. Moreover, optionally, the current sensing means enables detection of an event of fault by monitoring the specific attributes of the electrical power. In this regard, the current sensing means enables detection of, for example, over current faults, short circuit faults, open circuit faults, and the like.

The power converter comprises a voltage sensing means configured to measure input and output voltages of the first half-bridge and the second half-bridge. Specifically, the voltage sensing means refers to a voltage sensor configured to detect and/or respond to input voltage and output voltages of the first half-bridge and the second half-bridge. Optionally, the voltage sensing means includes components, such as sensors, memory, processor, network adapter, battery, and the like, to detect, store, process and/or share information with other computational elements, such as a user device, the controller, and so forth. More optionally, the voltage sensing means operates autonomously to continuously detect input and output voltages of the first half-bridge and the second half-bridge.

In this regard, the sensors in the voltage sensing means detect a specific attribute (namely, voltage) of the electrical power provided by the input electrical power supply across the first half-bridge and the second half-bridge. The specific attribute of the electrical power is communicated to the controller using, for example, wired communication means or wireless communication means. Optionally, the voltage sensing means stores the specific attribute of the electrical power in memory associated therewith. Beneficially, while sensing the voltage of the electrical power across both the half-bridges and the output and auxiliary inductors, the voltage sensing means further enables detection of an event of fault by monitoring the specific attribute of the electrical power. In this regard, the voltage sensing means further enables detection of, for example, over voltage faults, short circuit faults, open circuit faults, and the like, whenever the transistors switch in high switching frequency circuits, to ensure seamless achievement of ZVS during all the transitions.

The power converter comprises a controller configured to compute dead times of PWM control signal of the second half-bridge, generate PWM control signal of the second half-bridge and to adapt dead times of the first half-bridge. It will be appreciated that to ensure that there can be no "on"

or "off" overlap of two complementary PWM control signals, "dead time" is introduced between the two PWM control signals. Pursuant to the present disclosure, to compute the dead times of the PWM control signal of the second half-bridge, the controller is configured to compute target minimum and maximum current values of the auxiliary inductor in the second half-bridge, based on circuit parameters. Examples of the circuit parameters may include stray capacitance of transistors, auxiliary inductance, current value of the output inductor, and the like. The target minimum and maximum current values of the auxiliary inductor are computed based on computation of ZVS current to ensure that energy in the auxiliary inductor is greater than the energy required to charge/discharge the stray capacitance of the second set of transistors in the second half-bridge. Thus, the target minimum and maximum current values of the auxiliary inductor are computed so that ZVS is possible for all transitions in the second half-bridge.

Further, the controller is configured to compute the dead times of the PWM control signal of the second half-bridge corresponding to the computed minimum and maximum current values of the auxiliary inductor in the second half-bridge. The controller is configured to compute the dead times using analytical formulas, based on the circuit parameters and the input and output voltages, assuming that the system achieves the target minimum and maximum current values of the auxiliary inductor. The controller can obtain such analytical formulas by solving differential equations of the system during switching transitions, and determining the time required by the closing transistor voltage to reach zero. The circuit parameters used for the dead time calculation are summarized in the Table 3, as below:

TABLE 3

| Circuit parameters used for dead time calculations. | | | |
|---|---|---|---|
| Half-bridge | Transition | Circuit parameters used | Currents and voltages used |
| Second half-bridge | Rising Falling | Auxiliary inductance Transistor stray capacitance | $V_{in}, I_{aux}{}^{min}$ $V_{in}, I_{aux}{}^{max}$ |

In this regard, the $I_{aux}{}^{min}$ and $I_{aux}{}^{max}$ in Table 3 refer to the computed minimum and maximum current values of the auxiliary inductor, respectively. $V_{in}$ refers to the input voltage.

For sake of clarity, in an exemplary power converter, according to analytical formulas, for the falling transition of the second half-bridge, voltage in a closing transistor from the second set of transistors falls from $V_{in}$ to zero in 30 ns. Then, in theory, if a rising dead time of 50 ns is applied, ZVS may be achieved and switching losses may be minimized for such transition. If such dead time is shorter, voltage will not have enough time to drop to zero before the transistor is closed. So, the transistor will close at a voltage V>0 (for example 100V), leading to "partial hard-switching", increased losses, and ringing. If such dead time is longer, once stray capacitance is fully discharged, current will flow into the body diode of the closing transistor. As power dissipation in the body diode is larger than in the transistor (typically two times or more), additional conduction losses may occur. Thus, a dead time of 35 ns is applied in order to make up for the error margin of the model and minimize losses due to the transition.

Beneficially, when operating the power converter at high switching frequencies, computing the dead times of the PWM control signals becomes essential. For example, at MHz switching frequency, dead times may account for more than 15% of a half-bridge's switching cycle. Therefore, pursuant to the present disclosure, the dead time of the second half-bridge is optimized on a per-transition basis such that the dead time is as short as possible and long enough to enable the ZVS. The dead times differ between the first and second half-bridges, and between the rising and falling transitions. During such dead times, using analytical formulas and results from Table 2 below, adjusted shift and duty cycle differentials corresponding to the target minimum and maximum current values of the auxiliary inductor are computed.

Pursuant to the present disclosure, to generate the PWM control signal of the second half-bridge (hereinafter referred to as "auxiliary PWM control signal of the second half-bridge"), the controller is configured to copy the PWM control signal of the first half-bridge, and then advance the PWM control signal of the first half-bridge by a certain duration, referred as the adjusted shift, to set the amplitude of the current of the auxiliary inductor. It can be appreciated that width of a trapezoidal waveform of resulting current of the auxiliary inductor, as illustrated in FIG. 4C, is proportional to the magnitude of the adjusted shift. Furthermore, the controller is configured to increment the duty cycle by a small amount, referred as the adjusted duty cycle differential (which can be positive or negative), to set the average current of the auxiliary inductor. It can be appreciated that the average current of the auxiliary inductor is directly proportional to the adjusted duty cycle differential. Beneficially, the amplitude and average current of the auxiliary inductor determined by the controller based on the adjusted shift and the duty cycle differential, respectively, controls the waveform of the resulting current of the auxiliary inductor, due on which ZVS occurs for all the transitions. The PWM control signals of the first half-bridge, the auxiliary PWM control signals of the second half-bridge and the resulting current value of the auxiliary inductor during one switching cycle are represented in FIGS. 4A, 4B and 4C, respectively.

Pursuant to the present disclosure, the controller is further configured to adapt dead times of the first half-bridge using analytical formulas, based on the circuit parameters and the input and output voltages, assuming that the system achieves the computed minimum and maximum current values of the auxiliary inductor. The controller can obtain such analytical formulas by solving differential equations of the system during switching transitions, and determining the time required by the closing transistor voltage (in the first half-bridge) to reach zero. The circuit parameters used for the dead time calculation are summarized in the Table 4, as below:

TABLE 4

| Circuit parameters used for dead time calculation. | | | |
|---|---|---|---|
| Half-bridge | Transition | Circuit parameters used | Currents and voltages used |
| First half-bridge | Rising Falling | Auxiliary inductance Output Inductance Transistor stray capacitance | $V_{in}, V_{out}, (I_{aux}{}^{max} - I_{out})$ $V_{in}, V_{out}, (I_{out} - I_{aux}{}^{min})$ |

In this regard, the $I_{aux}{}^{min}$ and $I_{aux}{}^{max}$ in Table 4 refer to the computed minimum and maximum current values of the auxiliary inductor, respectively. $V_{in}$ and $V_{out}$ refer to the input and output voltages, respectively. $I_{out}$ refers to the output inductor current. Based on the difference between the current values of the output inductor and the auxiliary inductor (i.e., ($I_{aux}^{max}-I_{out}$) in case of rising transition, and ($I_{out}-I_{aux}^{min}$) in case of falling transition in the first half-bridge, the second half-bridge determines whether ZVS is possible or not in the first half-bridge.

For sake of clarity, in the exemplary power converter, assuming that the constant values of the input voltage $V_{in}$, output voltage $V_{out}$, and the output inductor current $I_{out}$ are 800V, 200V, and 50 A, respectively, the dead times of the first half-bridge is calculated according to the analytical formulas. Thereafter, optionally, the dead times may be optimized. For the falling transition of the first half-bridge, voltage in a closing transistor from the first set of transistors falls from $V_{in}$ to zero in 30 ns. Then, in theory, if a rising dead time of 50 ns is applied, ZVS may be achieved and switching losses may be minimized for such transition. If such dead time is shorter, voltage will not have enough time to drop to zero before the transistor is closed. So, the transistor will close at a voltage V>0 (for example 100V), leading to "partial hard-switching", increased losses, and ringing. If such dead time is longer, once stray capacitance is fully discharged, current will flow into the body diode of the closing transistor. As power dissipation in the body diode is larger than in the transistor (typically two times or more), additional conduction losses may occur. Thus, a dead time of 35 ns is applied in order to make up for the error margin of the model and minimize losses due to the transition. Beneficially, the dead times of the first half-bridge are optimized on a per-transition basis such that the dead times are as short as possible and long enough to enable the ZVS.

The controller, as used in the present disclosure, refers to a computational element that is operable to implement a control algorithm and process instructions that drive the power converter. The controller processes the attributes, i.e., current and voltage, of the input electrical power by employing a processor, one or more processing devices or processing elements associated with the controller. In an exemplary embodiment, as illustrated in FIG. 1B, the controller may correspond to a digital signal processing controller that receives data provided by the current and voltage sensing means, processes data for output electrical power and adjusts the plurality of switches accordingly. Other examples of the controller may include, but not limited to, a microprocessor, a microcontroller, a complex instruction set computing (CISC) microprocessor, a reduced instruction set (RISC) microprocessor, a very long instruction word (VLIW) microprocessor, or any other type of processing circuit.

Optionally, the processing device comprises processor, memory, network adapter, and the like. More optionally, the processing device is a remote server. Notably, the processing device performs computations (namely, calculations) for the controller thereby enabling the controller to perform at high frequencies. Moreover, the processing device enables the user of the power converter to adjust the power converter, for example, setting specific power flow criteria in the power converter, setting different value for the output electrical power, defining a nature of the input electrical power, defining a nature of the target electrical output power, and so forth. Such adjustments to the power converter can be made without changing the hardware (specifically, circuitry) thereby making the power converter flexible to the needs of the user. In such a case, the processing arrangement provides a user-interface to the user to adjust, such as, to set a value of output electrical power, and the like.

According to an embodiment, with the output inductor attached to a half-bridge of the equipped converter the output inductor is configurable to allow a stray capacitance of a closing transistor of the first set of transistors to be discharged and a stray capacitance of an opening transistor of the first set of transistors to be charged. Specifically, for the first half-bridge to achieve ZVS when a transition occurs, the output inductor may be configured to discharge the stray capacitance of the closing transistor (the voltage of which goes from $V_{in}$ to zero) based on the current flow towards the output inductor. The closing transistor is one of the first set of transistors during operation of the power converter. The output inductor is further configurable to charge the stray capacitance of the opening transistor (the voltage of which goes from zero to $V_{in}$) based on the current flowing from the output inductor. The opening transistor is other of the first set of transistors.

It will be appreciated that a transistor has a small intrinsic (or stray) capacitance, such as 350 pF, due to which a significant voltage may be present across such capacitance immediately prior to switching ON. The presence of the voltage across the capacitance is due to relatively large voltage previously placed on switching node by the inductor (connected to the switching node of the transistor) when the transistor is switched OFF. When the transistor is switching ON, the intrinsic capacitance is substantially discharged from $V_{in}$ to zero and the current flows towards the output inductor. On the other hand, when the transistor is switching OFF, the intrinsic capacitance is substantially charged from zero to $V_{in}$ and the current flows from the output inductor. Beneficially, the ZVS is achieved whenever, each transition occurs, the flow of the current of the output inductor is in the right direction and is large enough.

According to an embodiment, the second half-bridge is configured to drive the current of the switching node of the first half-bridge to the desired value before each of its transitions and control the current of the auxiliary inductor. According to another embodiment, the auxiliary inductor is configured to perform zero voltage switching in the first half-bridge and in the second half-bridge.

For example, as illustrated in FIG. 4C, when operating the first and second half bridges in phase shifted manner the current waveform becomes trapezoidal. The trapezoidal operation of the two half bridges means that they supply each other the required currents allowing ZVS, i.e., meaning the parasitic capacitances are charged so that all switching transitions take place at zero voltage. Furthermore, as in FIG. 2, it facilitates that $I_{aux}$ is negative enough, when 204b switches off and after configurable dead time 204a switches on, and $I_{aux}$ is positive enough, when 204a is on, so that the parasitic capacitances can be charged making voltage at 204b zero roughly at a time it switches on by first adjusting the dead time to reflect the current and capacitances.

Specifically, the connection of the second half-bridge to the first half-bridge allows ZVS for each of its transitions based on the difference between the current values of the output inductor and the auxiliary inductor. Thus, the second half-bridge is configured to work as a current source that drives the current of the switching node of the first half-bridge to the desired value before each of its transitions. For example, with reference to Table 1 below, ZVS is achieved in the first half-bridge when $I_{OUT}-I_{AUX}<0$ during a rising transition, and $I_{OUT}-I_{AUX}>0$ during a falling transition, where $I_{OUT}$ is the current value of the output inductor and $I_{AUX}$ is the current value of the auxiliary inductor. Beneficially, the auxiliary inductor in the second half-bridge helps the first half-bridge in achieving the ZVS for each of its transitions.

Further, the second half-bridge is configured to control the evolution of the current of the auxiliary inductor. Beneficially, the auxiliary inductor in the second half-bridge allows for ZVS in the second half-bridge itself. For example, with reference to Table 1 below, ZVS is achieved in the second half-bridge when the auxiliary inductor current, i.e., $I_{AUX}$, is less than a constant current value, i.e., $-I_0$, during a rising transition. Further, ZVS is achieved in the second half-bridge when the auxiliary inductor current, i.e., $I_{AUX}$, exceeds a constant current value, i.e., $+I_0$, during a falling transition.

TABLE 1

ZVS conditions in the first and second half-bridges.

| Half-bridge | Auxiliary | | Main | |
|---|---|---|---|---|
| Transition | Rising | Falling | Rising | Falling |
| Condition | $I_{AUX} < -I_0$ | $I_{AUX} > +I_0$ | $I_{OUT} -$ $I_{AUX} < 0$ | $I_{OUT} -$ $I_{AUX} > 0$ |

According to an embodiment, inductance of the auxiliary inductor is smaller than inductance of the output inductor. Notably, the inductance of the auxiliary inductor may be controlled, and thus can have variable inductance. The auxiliary inductor is made smaller due to larger fluctuation required in $I_{aux}$. This is required for ZVS to take place with the trapezoidal PWM modulation, and to prevent a drastic reduction of the ZVS range.

According to an embodiment, a waveform shape of the current of the auxiliary inductor is determined by switching the second half-bridge with respect to the first half-bridge. Specifically, the second half-bridge is configured to control the evolution of the current of the auxiliary inductor. With reference to Table 2 below, for one possible state, when the second half-bridge is switched OFF and the first half-bridge is switched ON, the derivative of the current of the auxiliary inductor is non-zero, i.e. $-V_{in}/L_{aux}$, where $-V_{in}$ refers to input voltage and $L_{aux}$ refers to auxiliary inductance. This results in a first slope of the waveform of the auxiliary inductor current, as indicated in FIG. 4C. For another possible state, when the second half-bridge is switched ON and the first half-bridge is switched OFF, the derivative of the current of the auxiliary inductor current is again non-zero, i.e., $+V_{in}/L_{aux}$, where $+V_{in}$ refers to input voltage and $L_{aux}$ refer to auxiliary inductance. This results in a second slope of the waveform of the auxiliary inductor current, as indicated in the FIG. 4C. However, for rest of the possible states, i.e., when both the first and the second half-bridges are simultaneously switched ON or switched OFF, the derivative of the current of the auxiliary inductor is 0. Beneficially, the switching of the second half-bridge with respect to the first half-bridge determines the trapezoidal waveform shape of the current of the auxiliary inductor to ensure seamless achievement of ZVS during each transition.

TABLE 2

Derivative of the auxiliary inductor current in function of the respective states of the half-bridges

| First state | Second state | |
|---|---|---|
| | ON | OFF |
| ON | 0 | $-V_{in}/L_{aux}$ |
| OFF | $+V_{in}/L_{aux}$ | 0 |

Further, width of a trapezoidal waveform of resulting current of the auxiliary inductor is proportional to the magnitude of the adjusted shift, and the average current of the auxiliary inductor is directly proportional to the adjusted duty cycle differential. Accordingly, the auxiliary inductor current is a trapezoidal wave, as illustrated in FIG. 4C, the shape of which is set by switching the second half-bridge with respect to the first half-bridge.

In another aspect, the present disclosure also relates to a method as described above. Various embodiments and variants disclosed above apply mutatis mutandis to the method.

The method comprises measuring an input voltage and an output voltage values of a first half-bridge and of a second half-bridge of a system. At switching cycle scale, the input voltage and output voltage values of the first half-bridge and the second half-bridge are measured by a voltage sensing means in the power converter. More optionally, the voltage sensing means operates autonomously to continuously detect the input voltage and output voltage values of the first half-bridge and the second half-bridge. Beneficially, the input voltage and the output voltage values of the first half-bridge and the second half-bridge of the system are measured iteratively to determine an error on amplitude and average current values of the auxiliary inductor if previous shift and duty cycle differential values are incorrect. Based on the error value, an adjustment in the shift and duty cycle differential are determined.

The method further comprises measuring an average and a maximum output current values of an output inductor. At switching cycle scale, the average and maximum output current values of the output inductor are measured by a current sensing means in the power converter. More optionally, the current sensing means operates autonomously to continuously detect the average and maximum current values of the output inductor. Beneficially, the measured average and maximum output current values of the output inductor is provided to the controller to calculate an average, minimum and maximum current values of an auxiliary inductor, based on which shift and duty cycle differentials are eventually determined.

The method further comprises calculating an average, minimum and maximum current values of an auxiliary inductor based on the measured input and output voltage and the output current values. The controller is configured to calculate the ZVS current $I_0$ required to charge/discharge a pair of transistors, i.e., the second set of transistors, such that energy in the auxiliary inductor is greater than the energy required to charge/discharge the stray capacitance of the pair of transistors. Thereafter, using Table 2 above, the target minimum and maximum current values of the auxiliary inductor in the second half-bridge is calculated.

For sake of clarity, in an exemplary power converter, the circuit parameters may be: an input voltage which is constant at 800V, an output voltage which is constant at 200V, an output inductor current which is constant at 50 A, a duty cycle of the first half-bridge which is constant at 70%, a stray capacitance of a transistor which is 350 pF, and an auxiliary inductance which is 5 μH. Now, energy required to be provided to the pair of transistors is:

$$2*\left(\frac{1}{2}*350 \text{ pF}*(800 \text{ V})^2\right) = 224 \ \mu J,$$

So, ZVS current $I_0$ can be deduced as:

$$\frac{1}{2}LI_0^2 = 222 \ \mu J.$$

This implies $I_0$=9.5 A.

Minimum current value of the auxiliary inductor should be less than $-I_0$, i.e.—9.5 A, and maximum current value of the auxiliary inductor should be more than 50 A+$I_0$, i.e. 59.5 A. With an error margin of 2.5 A, target minimum and maximum current values of the auxiliary inductor are calculated to be respectively $I_{aux}^{min}$=−12 A and $I_0$=62 A.

Beneficially, the average, minimum and maximum current values of the auxiliary inductor are calculated so that ZVS is achieved for all the transitions.

The method further comprises computing, based on the calculated average, minimum and maximum current values of the auxiliary inductor, a rising dead time and a falling dead time of pulse width modulation control signal for a first half-bridge and for a second half-bridge. Beneficially, the rising and falling dead times are computed so that there can be no "on" or "off" overlap of two complementary PWM control signals for the first half-bridge and for the second half-bridge as the frequency of operation increases.

According to an embodiment, computing the optimal dead times comprises computing for the second half-bridge the rising dead time as a function of the input voltage and the minimum current value of the auxiliary inductor, and the falling dead time as a function of the input voltage and the maximum current value of the auxiliary inductor. The computing the optimal dead times further comprises computing for the first half-bridge computing the rising dead time as a function of the input and output voltage, the average and maximum output current, and the maximum current value of the auxiliary inductor, and the falling dead time as a function of the input and output voltages, the average and maximum output current, and the minimum current value of the auxiliary inductor. Beneficially, the optimal dead times are computed on a per-transition basis such that the dead times are as short as possible and long enough to enable the ZVS. Such optimized dead times ensure maximized efficiency while operating at higher frequencies.

The method further comprises computing optimal dead times. The controller is configured to compute the dead times using analytical formulas, based on the circuit parameters and the input and output voltages, assuming that the system achieves the target minimum and maximum current values of the auxiliary inductor. For example, the circuit parameters for the rising and falling dead times of the second half-bridge are auxiliary inductance and transistor stray capacitance. On the other hand, the circuit parameters for the rising and falling dead times of the first half-bridge are auxiliary inductance, output inductance, and transistor stray capacitance. The circuit parameters and current and voltages used for each dead time calculation are summarized in the Table 3 above. The controller can obtain such analytical formulas by solving differential equations of the system during switching transitions, and determining the time required by the closing transistor voltage to reach zero.

Beneficially, when operating the power converter at high switching frequencies, computing the optimal dead times of the PWM control signals becomes essential. For example, at MHz switching frequency, dead times can account for more than 15% of a half-bridge's switching cycle. Therefore, pursuant to the present disclosure, the dead times are optimized on a per-transition basis such that the dead times are as short as possible and long enough to enable the ZVS.

The method further comprises computing a shift to apply. According to an embodiment, computing the shift as function of the calculated minimum and maximum current values of the auxiliary inductor, and of the input voltage. The shift to apply, which corresponds to the computed minimum and maximum current values of the auxiliary inductor, is computed by the controller using analytical formulas. Such analytical formulas combine the results of Table 2 above with a simple model of the evolution of the current value of the auxiliary inductor during dead times. For example, the controller computes the shift as function of the measured minimum and maximum current values of the auxiliary inductor, and of the input voltage. Beneficially, the controller computes the shift so that the amplitude of the current value of the auxiliary inductor matches with amplitude of target value, i.e., target minimum and maximum current values of the auxiliary inductor.

For sake of clarity, in the exemplary power converter, for the target minimum and maximum current values of the auxiliary inductor that are computed to be respectively $I_{aux}^{min}$=−12 A and $I_{aux}^{max}$=62 A, the shift to apply is computed by the controller by computing desired amplitude of the current of the auxiliary inductor as 62−(−12)=74 A. This implies that the current of the auxiliary inductor must go from −12 A to 62 A when the system is in (Auxiliary UP, Main DOWN) state that lasts for a duration Δt. If the effect of dead times is included, then this state lasts for Δt=−80 ns and current must go from −8 A to 57 A instead. In (Auxiliary UP, Main DOWN) state, current rises at a constant rate $$\frac{V_{in}}{L_{aux}} = 200\frac{A}{\mu s}.$$

So the shift must be:

$$\Delta t = \frac{65A}{200A/\mu s} + 80 \text{ ns} = 405 \text{ ns}.$$

According to an embodiment, computing the shift comprises incrementing the shift by a quantity δt. Notably, the controller is configured to adjust the applied shift in case the computed shift is inaccurate due to the accumulation of modelling errors. In such case, the controller performs correction of the applied shift using an iterative approach. Accordingly, the controller receives measured minimum and maximum current values of the auxiliary inductor sensed by the current sensing means and computes the amplitude of the current of the auxiliary inductor. Accordingly, the controller computes error on the amplitude of the current of the auxiliary inductor based on the differential of the computed and the measured amplitude of the current of the auxiliary inductor. Beneficially, the controller adjusts (or updates) the shift to compensate for the errors, based on the following mathematical expression:

Until errors < threshold: $\{\Delta t(n+1) = \Delta t(n) + f(\text{current amplitude error})\}$ For sake of clarity, in the exemplary power converter, as described above, the computed minimum and maximum current values of the auxiliary inductor are −12 A and 62 A. The measured minimum and maximum current values are −10 A and 60 A. The amplitude error δt of the current of the auxiliary conductor is computed to be 74−70=4 A. Proportional controllers of respective gain 10 ns/A is used in order to update the shift, as:

$$\Delta t(n+1) = \Delta t(n) + 40 \text{ ns}$$

The method further comprises computing a duty cycle differential to apply. The controller is configured to compute the duty cycle differential corresponding to the computed minimum and maximum current values of the auxiliary inductor, using analytical formulas. Such analytical formulas combine the results of Table 2 above with a simple model of the evolution of the current value of the auxiliary inductor during dead times. Beneficially, the controller computes the duty cycle differential such that the average current value of the auxiliary inductor matches with target average current value of the auxiliary inductor, according to a state-space model of the system.

For sake of clarity, in the exemplary power converter, for the target minimum and maximum current values of the auxiliary inductor that are computed to be respectively $I_{aux}^{min} = -12$ A and $I_{aux}^{max} = 62$ A, the duty cycle differential is computed by computing the target average current value of the auxiliary inductor as:

$$0.7*62 + (1 - 0.7)*(-12) = 40A, \text{ if the duty cycle } D \text{ is } 0.7.$$

According to a state-space model of the system, with a duty cycle differential of δD=0.2%, average current value of the auxiliary inductor will eventually stabilize at 40 A. So, the duty cycle differential is δD=0.2%.

According to an embodiment, computing the duty cycle differential comprises using a dynamical model of the average current value of the auxiliary inductor $I_{aux}$=F(s)·(δD+c (transitions)). The controller may be configured to increment the duty cycle of the auxiliary PWM control signal of the auxiliary inductor by a small amount, referred as the adjusted duty cycle differential δD (which can be positive or negative), to set the average current of the auxiliary inductor. It can be appreciated that the average current of the auxiliary inductor is proportional to the adjusted duty cycle differential δD. Notably, the duty cycles of the main and the auxiliary PWM control signals are close to equal to reduce the average current value of the auxiliary inductor. However, gain of the transfer function F(s) is large (10 kS for example), so the applied duty differential is small in comparison with the applied dead times, i.e., timing δD·$T_s$ is <10 ns while deadtimes are 30-120 ns, for example. So, we need to consider the average voltage during the switching transitions in computations. When considering the switching transitions, and solving the differential equations of the switching node voltages during switching transitions it follows that:

$$V_{aux}^{average} = \left((D + \delta D) + \left(c_{aux}^{rise} + c_{aux}^{fall}\right)\right) \cdot V_{in}$$

$$V_{main}^{average} = \left((D + \delta D) + \left(c_{main}^{rise} + c_{main}^{fall}\right)\right) \cdot V_{in}$$

wherein c terms depend on the switching transitions as follows:

$$I_{aux}^{average} = F(s) \cdot \left(\delta D + \left(c_{aux}^{rise} + c_{aux}^{fall}\right) - \left(c_{main}^{rise} + c_{main}^{fall}\right)\right) \cdot V_{aux}^{average}$$

wherein $$c_{aux}^{rise} = f\left(-I_{aux}^{min}\right),$$

$$c_{aux}^{fall} = f(I_{aux}^{max}),$$

$$c_{main}^{rise} = g(I_{aux}^{max} - I_{out}),$$

$$c_{main}^{fall} = g\left(I_{out} - I_{aux}^{min}\right),$$

Figure 6:
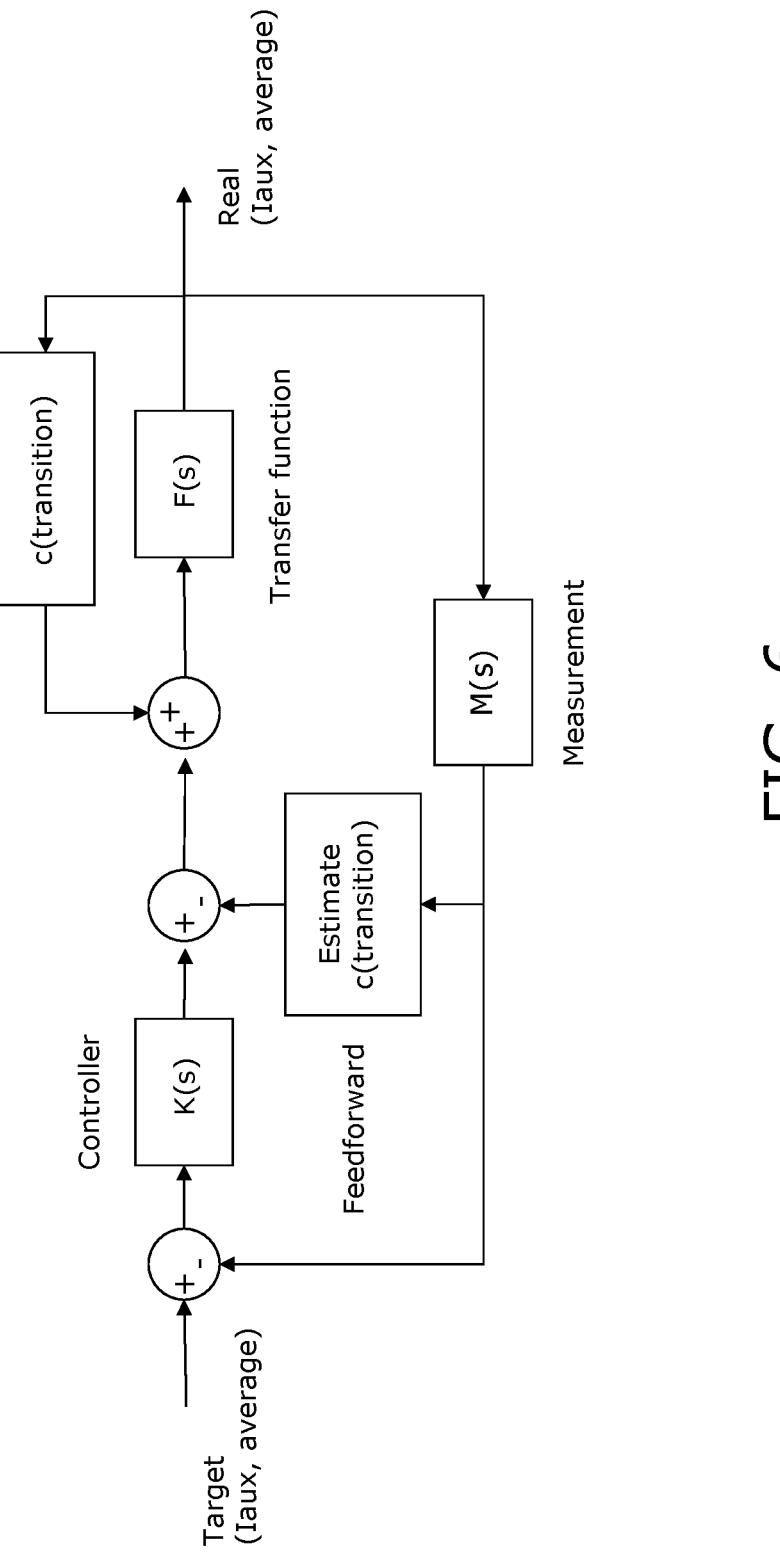
FIG. 6 is a controller implementation in accordance with an embodiment of the present disclosure.

The equation can then be written as follows (in Laplace domain):

$$I_{aux}^{average} = F(s) \cdot (\delta D + c(\text{transitions})) \cdot V_{aux}^{average}$$

wherein c(transitions) is nonlinear value, and dependent on the measured $I_{out}$ and the applied shift and it is implemented in the controller in tabulated form. In the implementation, the transition term c(transition) is estimated in real-time, and it is removed using a feedforward, as illustrated in FIG. 6.

According to an embodiment, computing the duty cycle differential comprises incrementing the duty cycle differential by a quantity SD. Optionally, the controller is configured to adjust the duty cycle differential in case the computed duty cycle differential value is inaccurate due to the accumulation of modelling errors. In such case, the controller performs correction of the duty cycle differential using an iterative approach. Accordingly, the controller receives measured minimum and maximum current values of the auxiliary inductor sensed by the current sensing means and computes the average current value of the auxiliary inductor. Accordingly, the controller computes error on the average current of the auxiliary inductor based on the differential of the computed and the measured average current of the auxiliary inductor. Beneficially, the controller adjusts (or updates) the duty cycle differential to compensate for the errors, based on the following mathematical expression:

Until errors < threshold: $\{\delta D(n+1) = \delta D(n) + g(\text{average current error})\}$ For sake of clarity, in the exemplary power converter, as described above, the computed minimum and maximum current values of the auxiliary inductor are −12 A and 62 A. The measured minimum and maximum current values are −10 A and 60 A. If the duty cycle D is 0.7, the current average error δD is computed to be (0.7*62−0.3*12)− (0.7*60−0.3*10)=1 A. Proportional controllers of respective gain 0.05%/A is used in order to update the duty cycle differential, as:

$$\delta D(n+1) = \delta D + 0.05\%$$

According to an embodiment, generating the pulse width modulation control signal of the second half-bridge comprises copying the pulse width modulation control signal of the first half-bridge, setting the amplitude of the current of the auxiliary inductor, and setting the average current of the auxiliary inductor.

Pursuant to the present disclosure, to generate the PWM control signal of the second half-bridge, the controller is configured to copy the PWM control signal of the first half-bridge, and then advance the PWM control signal of the first half-bridge by a certain duration, referred as the shift $\Delta t$, to set the amplitude of the current value of the auxiliary inductor. It can be appreciated that the width of the trapezoidal waveform of the of the current of the auxiliary inductor is proportional to the magnitude of the shift. Further, the controller is configured to increment the duty cycle by a small amount, referred as the duty cycle differential $\delta D$ (which can be positive or negative), to set the average current of the auxiliary inductor. It can be appreciated that the average current of the auxiliary inductor is directly proportional to the adjusted duty cycle differential. Beneficially, such a combination of steps ensures that the second half-bridge controls the evolution of the auxiliary inductor current. The main and auxiliary PWM control signals of both the first and the second half-bridges, respectively, and the resulting current value of the auxiliary inductor during one switching cycle are represented in FIGS. 4A, 4B, and 4C.

According to an embodiment, generating the PWM control signal of the second half-bridge is based on parameters of a switching period, a duty cycle, a shift and a duty cycle differential. Beneficially, the switching period is set at the power converter level and the duty cycle is set at the control loop level. The role of the shift is to adjust the amplitude of the current of the auxiliary inductor. The role of the duty cycle differential $\delta D$ is to adjust the average current value of the auxiliary inductor.

According to an embodiment, the PWM signal of the auxiliary half-bridge may be generated by using hysteresis control. With this analog control scheme, the auxiliary and output inductor currents are measured, and the system's input and output voltages are measured. Based on the ZVS current margin conditions, a target value for the minimum and maximum auxiliary inductor currents are defined. The half-bridge is operated independently from the auxiliary half-bridge control scheme. The auxiliary inductor current evolution is then defined as follows:

$$L_{aux} \cdot \frac{di}{dt} = V_{auxiliary\ Half-Bridge} - V_{main\ Half-Bridge}$$

Figure 7:
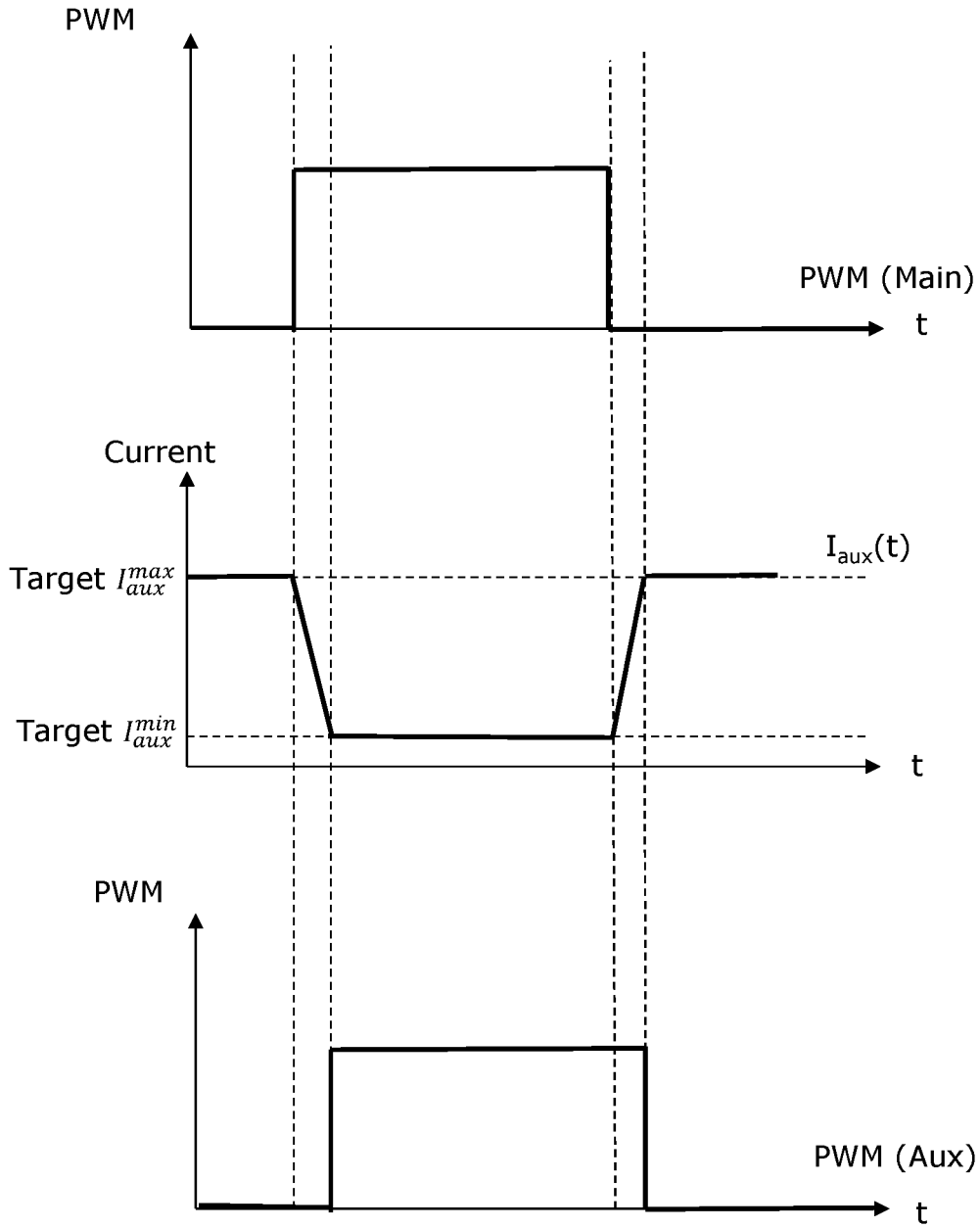
FIG. 7 is a schematic illustration of waveforms, in accordance with an embodiment of the present disclosure.

Thus, when the main half-bridge switches UP, the auxiliary half-bridge is initially in DOWN state so inductor current decreases. When $I_{aux}=target(I_{aux}^{min})$, the auxiliary half-bridge is turned UP to stabilize the auxiliary half-bridge current. In addition, when the half-bridge switches DOWN, the auxiliary half-bridge is initially in UP state so inductor current increases. When $I_{aux}=target(I_{aux}^{max})$, the auxiliary half-bridge is turned DOWN to stabilize the auxiliary half-bridge current, as illustrated in FIG. 7. The approach is equivalent to operating the system with a negative shift, and to setting the duty cycle differential with a dead-beat controller. In practice, this takes into account the switching transients of the system, and the propagation delay of the analog controller, so two thresholds are set: $I_{inf}$ and $I_{sup}$ so that auxiliary half-bridge switches UP when $I_{aux} \leq I_{inf}$, wherein $I_{inf}$ is defined so that, once the switching action is over, $I_{aux}=target(I_{aux}^{min})$, and, in addition, auxiliary half-bridge switches DOWN when $II_{aux} \geq I_{sup}$, wherein $I_{sup}$ is defined so that, once the switching action is over, $I_{aux}=target$ $(I_{aux}^{max})$. Thresholds $I_{inf}$ and $I_{sup}$ might optionally be set using an advanced control scheme, such as Sliding Mode Control.

According to an embodiment, the method further comprises applying the zero-voltage switching in a single-phase half-bridge converter, in a single phase full-bridge converter or in a three phased boost inverter. Beneficially, due to the topology and control signals, the aforesaid converters achieve higher power density while maintaining similar-to-higher levels of efficiency and ensuring that ZVS is achieved for each transition.

DETAILED DESCRIPTION OF THE DRAWINGS

Figure 1B:
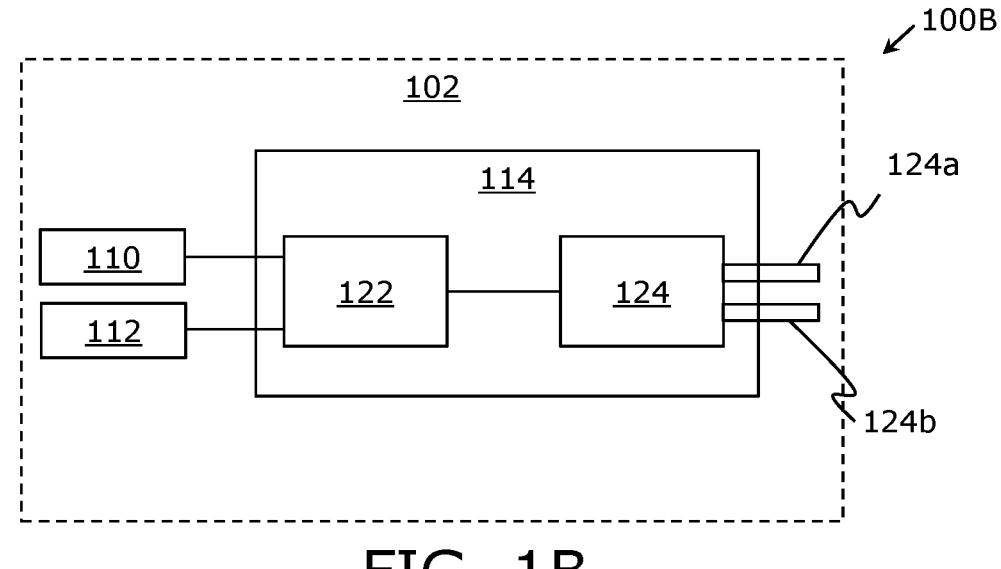
FIG. 1B is a block diagram of a controller, in accordance with an embodiment of the present disclosure.

Referring to FIG. 1A, there is shown a block diagram 100A of a power converter 102, in accordance with an embodiment of the present disclosure. The power converter 102 comprises an input electrical power supply 104, a first half-bridge 106, a second half-bridge 108, a current sensing means 110, a voltage sensing means 112, and a controller 114. The power converter 102 further comprises a power input 116 for receiving input electrical power from the input electrical power supply 104, and a power output 118 for providing output electrical power. The power converter 102 is further coupled to a load 120, wherein the output electrical power is supplied to the load 120, via the power output 118. Examples of the load include, but is not limited to, a battery, a motor, an electrical device, an electronic device, and an electro-mechanical device.

The controller 114 is configured to receive average and maximum current values of an output inductor (shown in FIG. 2) of the first half-bridge 106 and an average, minimum and maximum current values of the auxiliary inductor (shown in FIG. 2) of the second half-bridge 108 from the current sensing means 110. The controller 114 is further configured to receive input and output voltages of the first half-bridge 106 and the second half-bridge 108 from the voltage sensing means 112. Accordingly, the controller 114 is configured to compute dead times of PWM control signal of the second half-bridge 108, generate PWM control signal of the second half-bridge 108 and to adapt dead times of the first half-bridge 106. The controller 114 is further configured to calculate a target average, a minimum and a maximum current values of an auxiliary inductor 206 based on the measured input and output voltage and the output current values; compute, based on the calculated target average, a minimum and a maximum current values of the auxiliary inductor 206, a rising dead time and a falling dead time of pulse width modulation control signal for a first half-bridge 106, 202 and for a second half-bridge 108, 204, 310, 312, 314; compute, based on the target minimum and maximum values for the auxiliary inductor current, on the measured value for the input voltage of the first bridge, and on the calculated rising and falling dead times of the first half-bridge and the second half-bridge, a shift to apply; and compute, based on the target value for the auxiliary inductor current, on the measured value for the input voltage of the first half-bridge, and on the calculated values for the dead times of the first and the second half-bridges, a duty cycle differential to apply.

Notably, the plurality of switching nodes in the first half-bridge 106 and the second half-bridge 108 are variably triggered to generate output electrical power, which is available at power output 118.

Referring to FIG. 1B, there is shown a block diagram 100B of the controller 114, in accordance with an embodiment of the present disclosure. The controller 114 comprises at least a computation block 122 and a pulse width modulator 124. The computation block 122 is connected to the current sensing means 110 and the voltage sensing means 112. In this regard, various output nodes (namely, output pins) (depicted as output nodes 124a and 124b) of the controller 114 are connected to the gate terminals of transistors of main (or first) and auxiliary (or second) circuits in the power converter 102 to provide triggering pulses variably. In this regard, the pulse width modulator 124 triggers the main circuit of the power converter 102 based on a first duty cycle by providing triggering pulses (a complementary set of PWM control signals) through output nodes 124a, and triggers the auxiliary circuit based on a second duty cycle by providing triggering pulses (a complementary set of auxiliary PWM control signals) through the output nodes 124b.

Referring to FIG. 2, there is shown a schematic electrical circuit diagram 200 of an auxiliary circuit, in accordance with an embodiment of the present disclosure. Herein, as shown, the auxiliary circuit consisting of a second half-bridge 204 and an auxiliary inductor 206, through which auxiliary inductor current $I_{AUX}$ passes. The second half-bridge 204 is identical to a first half-bridge 202. The auxiliary inductor 206 connects a switching node 208 of the first half-bridge 202 and a switching node 210 of the second half-bridge 204. Notably, the first half-bridge 202 comprises a first set of transistors 202a and 202b, and an output inductor 212, through which output inductor current $I_{OUT}$ passes, connected to the switching node 208 of the first set of transistors 202a and 202b, forming thereat a first circuit. Similarly, the second half-bridge 204 comprises a second set of transistors 204a and 204b and the auxiliary inductor 206 connected to the switching node 210 of the second set of transistors 204a and 204b and to the switching node 208 of the first set of transistors 202a and 202b, forming thereat a second circuit.

The drains of transistor 202a (from the first half-bridge 202) and transistor 204a (from the second half-bridge 204) are connected together and then connected to the positive terminal of the input voltage Vi. The sources of transistor 202b (from the first half-bridge 202) and transistor 204b (from the second half-bridge 204) are connected together and then connected to the ground. The source of transistor 202a and the drain of transistor 202b are connected together through the switching node 208 of the first half-bridge 202. Similarly, the source of transistor 204a and the drain of transistor 204b are connected together through the switching node 210 of the second half-bridge 204. The switching node 208, through the output inductor 212, is connected to the one terminal of the output voltage $V_{out}$, the other terminal of which is grounded.

The first set of transistors 202a and 202b is driven by PWM control signals, i.e., PWM and 1–PWM, at corresponding gate terminals. Further, the second set of transistors 204a and 204b is driven by auxiliary PWM control signals, $PWM^{AUX}$ and $1–PWM^{AUX}$, at corresponding gate terminals.

Notably, the auxiliary PWM control signals, $PWM^{AUX}$ and $1–PWM^{AUX}$, of the second half-bridge 204 lead the PWM control signals, PWM and 1–PWM, of the first half-bridge 202 by a variable phase angle, and corresponding duty cycles are close to equal. Differently, in a standard full-bridge, for example the schematic electrical circuit diagram 200, the PWM control signal of the two half-bridges, i.e., the first half-bridge 202 and the second half-bridge 204, are simply complementary. In other words, PWM and 1–PWM are complementary to each other and similarly, $PWM^{AUX}$ and $1–PWM^{AUX}$ are complementary to each other.

Further, the combination of the second half-bridge 204 and the auxiliary inductor 206 works as a current source and allows for ZVS in the first half-bridge 202 by driving the switching node current of the first half-bridge 202 to the desired value before each of its transitions. Differently, in a standard full-bridge, the second half-bridge 204 enable bidirectional power flow, and increase the range of possible $V_{in}/V_{out}$.

Figure 3:
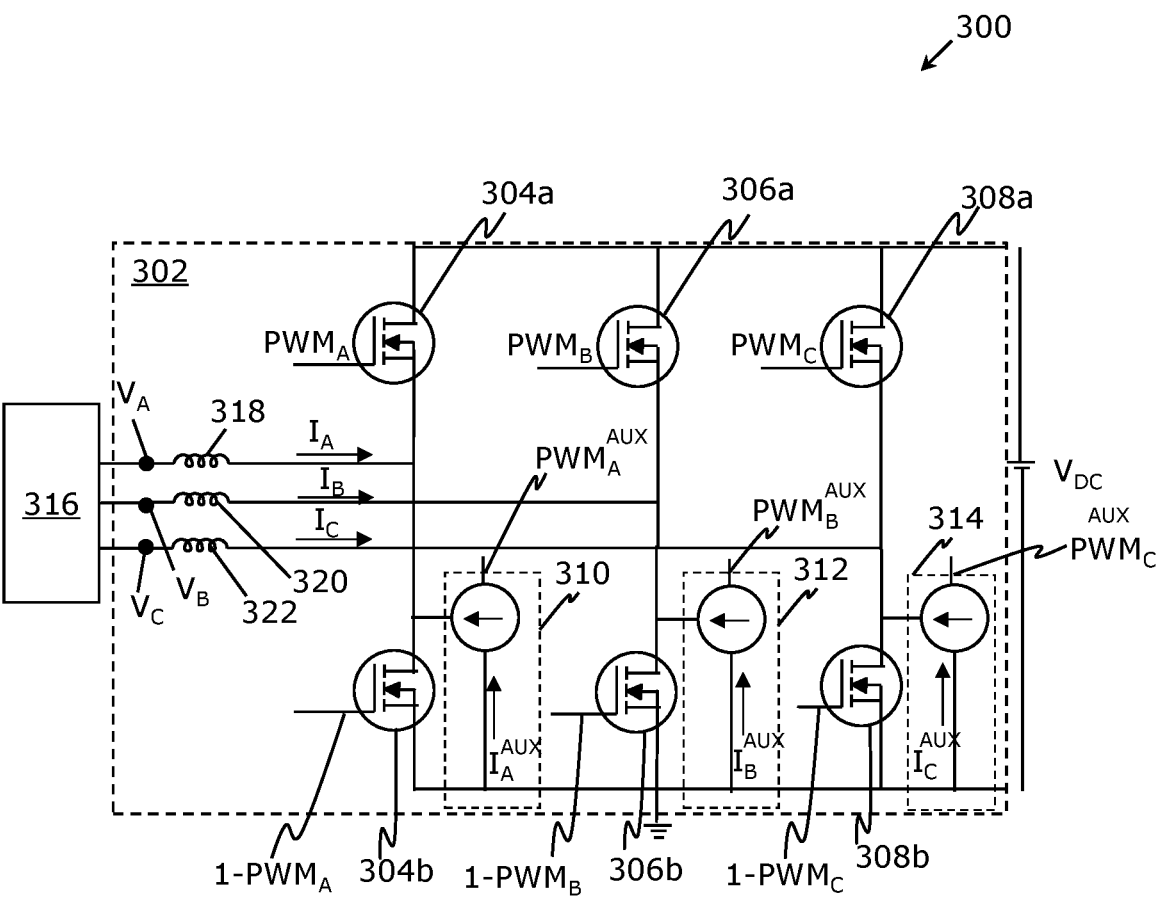
FIG. 3 is a schematic illustration of a power converter arrangement, in accordance with an embodiment of the present disclosure.

Referring to FIG. 3, there is shown a schematic illustration 300 of a power converter 302, in accordance with an embodiment of the present disclosure. Herein, as shown, the power converter 302 is fed with input electrical power supply, wherein the input electrical power supply provides a three-phase AC input electrical power (namely, a three-phase AC input 316), via power input (not shown). The power converter 302 comprises a plurality of half-bridges constructed using a plurality of switches. Herein the plurality of switches are implemented using transistors 304a, 304b, 306a, 306b, 308a, and 308b. Moreover, transistors 304a and 304b are connected with a first phase of the three-phase AC input 316, via an inductor 318. Transistors 306a and 306b are connected with a second phase of the three-phase AC input 316, via an inductor 320; and transistors 306a and 306b are connected with a third phase of the three-phase AC input 316, via an inductor 322. Moreover, a capacitor and a resistor may be connected with the load (not shown in FIG. 3), wherein the capacitor and the resistor are shunted with the load. Herein, a voltage $V_{DC}$ is supplied to the load, wherein the voltage $V_{DC}$ corresponds to output electrical power (for example, DC output voltage for power conversion from three-phase AC to DC). It will be appreciated that the connections in the power converter 302 are made by employing a plurality of connecting wires.

Furthermore, gate terminals of the transistors 304a, 304b, 306a, 306b, 308a, and 308b are connected to output nodes of a controller (not shown). Herein, the connection between the gate terminals of the transistors 304a, 304b, 306a, 306b, 308a, and 308b, and the output nodes enable the controller to variable trigger the transistors 304a, 304b, 306a, 306b, 308a, and 308b. Notably, the output nodes of a controller provide PWM control signals, i.e., $PWM_A$, $1–PWM_A$, $PWM_B$, $1–PWM_B$, $PWM_C$, and $1–PWM_C$, to the gate terminals of the transistors 304a, 304b, 306a, 306b, 308a, and 308b, respectively. Notably, the transistors 304a and 304b, the transistors 306a and 306b, and the transistors 308a and 308b are connected to auxiliary circuits, such as second half-bridges 310, 312, and 314, respectively. The gate terminals of the second half-bridges 310, 312, and 314 are driven by PWM control signals, i.e., $PWM_A^{AUX}$, $PWM_B^{AUX}$, and $PWM_C^{AUX}$, respectively. Beneficially, the second half-bridges 310, 312, and 314 work as current sources with current values, $I_A^{AUX}$, $I_B^{AUX}$, and $PWM_C^{AUX}$, that drive the switching node currents of the first half-bridges with transistors 304a, 304b, 306a, 306b, 308a, and 308b, respectively, to the desired values before each of transition. It may be understood by a person skilled in the art that the FIG. 3 is merely an example, which should not unduly limit the scope of the claims herein. The person skilled in the art will recognize many variations, alternatives, topologies, and modifications of embodiments of the present disclosure.

Referring to FIGS. 4 A, 4B, and 4C, there are shown schematic illustrations 400A, 400B, and 400C of waveforms, in accordance with an embodiment of the present disclosure. Notably, the X-Axis in the schematic illustrations 400A, 400B, and 400C of waveforms correspond to time during switching period. The Y-Axis in the schematic illustration 400A indicates main PWM control signal levels 0 (OFF state) and 1 (ON state). The Y-Axis in the schematic illustration 400B indicates auxiliary PWM control signal levels 0 (OFF state) and 1 (ON state). The Y-Axis in the schematic illustration 400C indicates current value. Herein, as shown in schematic illustration 400A, a waveform 402 of main PWM control signals of the first half-bridge is depicted during one switching cycle. For exemplary purpose, the duty cycle of the waveform 402 is shown to be D and the edge rises after a time ΔT (equivalent to adjusted shift). Further, as shown in schematic illustration 400B, a waveform 404 of auxiliary PWM control signals of the second half-bridge is depicted during one switching cycle. Notably, the waveform 404 of auxiliary PWM control signals is depicted to be in advance of the waveform 402 of main PWM control signals by a certain duration, referred as the adjusted shift Δt, to set the amplitude of the current of the auxiliary inductor. Further, the duty cycle of the waveform 404 of auxiliary PWM control signals is depicted to be an modified duty cycle of the waveform 402 by a small amount, referred as the adjusted duty cycle differential (SD), to set the average current of the auxiliary inductor.

Furthermore, as shown in schematic illustration 400C, a waveform of resulting current of the auxiliary inductor is depicted during one switching cycle. The waveform 406 of the auxiliary inductor current is a trapezoidal waveform plotted based on the evolution of the auxiliary inductor current controlled by the second half-bridge. Notably, the waveform 406 of the current of the auxiliary inductor is determined by switching the second half-bridge with respect to the first half-bridge. For the sake of simplicity, the waveform 408 of the output inductor current is represented as constant and the dead times are not included.

Referring to FIG. 5, there is shown a flow chart depicting steps of a method 500 for power conversion, in accordance with an embodiment of the present disclosure. The method 500 is implemented via a power converter. At a step 502, an input voltage and an output voltage values of a first half-bridge and of a second half-bridge of a system is measured. At a step 504, an average and a maximum output current values of an output inductor is measured. At a step 506, based on the measured input and output voltage and the output current values, an average, minimum and maximum current values of an auxiliary inductor is computed. At a step 508, based on the calculated average, minimum and maximum current values of the auxiliary inductor, a rising dead time and a falling dead time of pulse width modulation control signal for the first half-bridge and for the second half-bridge is computed. At a step 512, a shift to apply is computed. At a step 514, a duty cycle differential to apply is computed.

The steps 502, 504, 506, 508, 512, and 514 are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A system for zero-voltage switching in a power converter comprising a first half-bridge and a second half-bridge, wherein the first half-bridge comprises a first set of transistors and an output inductor connected to a switching node of the first set of transistors, forming thereat a first circuit, and the second half-bridge comprises a second set of transistors and an auxiliary inductor connected to a switching node of the second set of transistors and to the switching node of the first set of transistors, forming thereat a second circuit;

wherein the system further comprises a current sensing means configured to measure, at switching cycle scale, an average and a maximum current values of the output inductor and an average, a minimum and a maximum current values of the auxiliary inductor;

a voltage sensing means configured to measure input and output voltages of the first half-bridge and the second half-bridge, and a controller configured to compute dead times of pulse width modulation control signal of the second half-bridge, generate pulse width modulation control signal of the second half-bridge and to adapt dead times of the first half-bridge, wherein the controller is configured to:

calculate a target average, a minimum and a maximum current values of an auxiliary inductor based on the measured input and output voltage and the output current values;

compute, based on the calculated target average, a minimum and a maximum current values of the auxiliary inductor, a rising dead time and a falling dead time of pulse width modulation control signal for a first half-bridge and for a second half-bridge;

compute, based on the target minimum and maximum values for the auxiliary inductor current, on the measured value for the input voltage of the first bridge, and on the calculated rising and falling dead times of the first half-bridge and the second half-bridge, a shift to apply; and compute, based on the target value for the auxiliary inductor current, on the measured value for the input voltage of the first half-bridge, and on the calculated values for the dead times of the first and the second half-bridges, a duty cycle differential to apply.

2. The system according to claim 1, wherein the output inductor is configured to:

discharge a stray capacitance of a closing transistor of the first set of transistors;

charge a stray capacitance of an opening transistor of the first set of transistors.

3. The system according to claim 1, wherein the second half-bridge is configured to drive a current of the switching node of the first half-bridge to a desired value before each of its transitions;

control the current of the auxiliary inductor.

4. The system according to claim 1, wherein the auxiliary inductor is configured to perform zero voltage switching in the first half-bridge and in the second half-bridge.

5. The system according to claim 1, wherein inductance of the auxiliary inductor is smaller than inductance of the output inductor.

6. The system according to claim 1, wherein a waveform shape of the current of the auxiliary inductor is determined by switching the second half-bridge with respect to the first half-bridge.

7. A method for zero-voltage switching in a power converter, wherein the method comprising measuring an input voltage and an output voltage values of a first half-bridge and of a second half-bridge of a system;

measuring an average and a maximum output current values of an output inductor;

calculating a target average, a minimum and a maximum current values of an auxiliary inductor based on the measured input and output voltage and the output current values;

computing, based on the calculated target average, minimum and maximum current values of the auxiliary inductor, a rising dead time and a falling dead time of pulse width modulation control signal for a first half-bridge and for a second half-bridge;

computing, based on the target minimum and maximum values for the auxiliary inductor current, on the measured value for the input voltage of the first bridge, and on the calculated rising and falling dead times of the first half-bridge and the second half-bridge a shift to apply;

computing, based on the target value for the auxiliary inductor current, on the measured value for the input voltage of the first half-bridge, and on the calculated values for the dead times of the first and the second half-bridges, a duty cycle differential to apply.

8. The method according to claim 7, wherein computing the optimal dead times comprises computing for the second half-bridge the rising dead time as a function of the input voltage and the minimum current value of the auxiliary inductor, and the falling dead time as a function of the input voltage and the maximum current value of the auxiliary inductor;

computing for the first half-bridge computing the rising dead time as a function of the input and output voltage, the average and maximum output current, and the maximum current value of the auxiliary inductor, and the falling dead time as a function of the input and output voltages, the average and maximum output current, and the minimum current value of the auxiliary inductor.

9. The method according to claim 7, wherein computing the shift as function of the computed minimum and maximum current values of the auxiliary inductor, and of the input voltage.

10. The method according to claim 9, wherein computing the shift comprises incrementing the shift by a quantity dt.

11. The method according to claim 7, wherein computing the duty cycle differential comprises using a dynamical model of the average current value of the auxiliary inductor $I_{aux}=F(s)\cdot(\delta D+c(\text{transitions}))$.

12. The method according to claim 7, wherein generating the pulse width modulation control signal of the second half-bridge comprises copying the pulse width modulation control signal of the first half-bridge;

setting the amplitude of the current of the auxiliary inductor;

setting the average current of the auxiliary inductor.

13. The method according claim 7, wherein generating the pulse width modulation control signal of the second half-bridge is based on a switching period, a duty cycle, a shift and a duty cycle differential parameters.

14. The method according to claim 7, wherein generating the pulse width modulation control signal of the second half-bridge is based on hysteresis control.

15. The method according to claim 7, wherein the method further comprises applying the zero-voltage switching in a single-phase half-bridge converter, in a single phase full-bridge converter or in a three phased boost inverter.

* * * * *